(12) United States Patent
Miyahara et al.

(10) Patent No.: US 7,646,588 B2
(45) Date of Patent: Jan. 12, 2010

(54) CARBON NANOTUBE FILM, PRODUCTION PROCESS THEREOF AND CAPACITOR USING THE SAME

(75) Inventors: Tomoko Miyahara, Kanagawa (JP); Kazunori Anazawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 11/723,365

(22) Filed: Mar. 19, 2007

(65) Prior Publication Data

US 2008/0049380 A1 Feb. 28, 2008

(30) Foreign Application Priority Data

Aug. 17, 2006 (JP) ............................. 2006-222550

(51) Int. Cl.
*H01G 9/00* (2006.01)

(52) U.S. Cl. ........................................ 361/502; 977/742

(58) Field of Classification Search .................. 361/502, 361/503; 977/742, 750, 752; 423/447.2
See application file for complete search history.

(56) References Cited

U.S. PATENT DOCUMENTS 7,061,749 B2 * 6/2006 Liu et al. ..................... 361/502

2005/0041371 A1 * 2/2005 Kawata et al. ............... 361/503
2005/0069701 A1 3/2005 Watanabe et al.
2005/0127030 A1 6/2005 Watanabe et al.
2005/0284337 A1 12/2005 Shigematsu et al.
2006/0174932 A1 * 8/2006 Usui et al. ..................... 136/252
2008/0176052 A1 * 7/2008 Ma et al. ........................ 428/219

FOREIGN PATENT DOCUMENTS

| EP | 1 529 858 A1 | 5/2005 |
| JP | A 11-502494 | 3/1999 |
| JP | A 2002-503204 | 1/2002 |
| JP | A 2005-41835 | 2/2005 |
| JP | A 2005-154887 | 6/2005 |
| JP | A 2006-8861 | 1/2006 |
| WO | WO 96/18059 | 6/1996 |
| WO | WO 97/32571 | 9/1997 |

* cited by examiner

*Primary Examiner*—Eric Thomas
*Assistant Examiner*—David M Sinclair
(74) *Attorney, Agent, or Firm*—Oliff & Berridge, PLC

(57) ABSTRACT

A carbon nanotube film includes a first carbon nanotube group that is an aggregate of carbon nanotubes crosslinked to each other to form a network structure and a second carbon nanotube group that is an aggregate of carbon nanotubes having a diameter different from a diameter of the carbon nanotubes in the first carbon nanotube group, wherein the first carbon nanotube group and the second carbon nanotube group are in admixture.

2 Claims, 7 Drawing Sheets

REACTION SCHEME OF INTRODUCTION OF CARBOXYL GROUP INTO CARBON NANOTUBE

REACTION SCHEME OF POLYMERIZATION OF CARBON NANOTUBE CARBOXYLIC ACID METHYL ESTER WITH GLYCERIN BY ESTER EXCHANGE

CARBON NANOTUBE FILM, PRODUCTION PROCESS THEREOF AND CAPACITOR USING THE SAME

CROSS-REFERENCE TO RELATED APPLICATIONS

This application is based on and claims priority under 35 USC 119 from Japanese Patent Application No. 2006-222550 filed on Aug. 17, 2006.

BACKGROUND

1. Technical Field

The present invention relates to a carbon nanotube film and a production process thereof.

The invention also relates to a capacitor which is an electrical element utilizing such a carbon nanotube film.

2. Related Art

Carbon nanotubes have been expected to find wide application as next-generation materials that exhibit a variety of characteristics derived from its specific shape and structure.

Carbon nanotubes are in the form of a one-dimensional tube developed by winding a graphene sheet composed of 6-membered carbon ring. Carbon nanotubes having one graphene sheet are called single-walled carbon nanotube (SWCNT) and carbon nanotubes having multiple graphene sheets are called multi-walled carbon nanotube (MWCNT).

SWCNT is said to have a diameter of about 1 nm. MWCNT is normally said to have a diameter of about tens of nanometers. They are extremely finer than materials which have been heretofore called carbon fiber (diameter: from tens of nanometers to 1,000 nm).

Carbon nanotubes are also characterized in that they have a length on the order of micrometer (μm) and a very large aspect ratio of length to diameter.

Further, carbon nanotubes have 6-membered carbon rings aligned helically and thus are a material having so extremely rare characteristics that both metallic properties and semiconductivity are exhibited. In addition, carbon nanotubes have an extremely high electrical conductivity and thus allow the passage of current at a density of 100 MA/cm$^2$ or more.

Carbon nanotubes are excellent in mechanical characteristics as well as electrical properties. In some detail, since carbon nanotubes are composed of only carbon atoms, they exhibit a Young modulus of more than 1 TPa and thus are extremely rigid despite its very low weight.

Thus, carbon nanotubes have various excellent properties and thus are a material which is extremely attractive as industrial material. Carbon nanotubes have found application in the art of electronic devices (electronic elements) such as flat panel display and transistor.

As actual methods for processing and film-forming carbon nanotubes according to device design there are known film-forming/patterning methods involving chemical vapor deposition method (CVD method), electrophoresis method, screen printing method with a mixture with a binder, or the like.

SUMMARY

According to an aspect of the invention, there is provided a carbon nanotube film including a first carbon nanotube group that is an aggregate of carbon nanotubes crosslinked to each other to form a network structure and a second carbon nanotube group that is an aggregate of carbon nanotubes having a diameter different from a diameter of the carbon nanotubes in the first carbon nanotube group, wherein the first carbon nanotube group and the second carbon nanotube group are in admixture.

BRIEF DESCRIPTION OF THE DRAWINGS

Exemplary embodiment(s) of the present invention will be described in detail based on the following figures, wherein.

DETAILED DESCRIPTION

Figure 1:
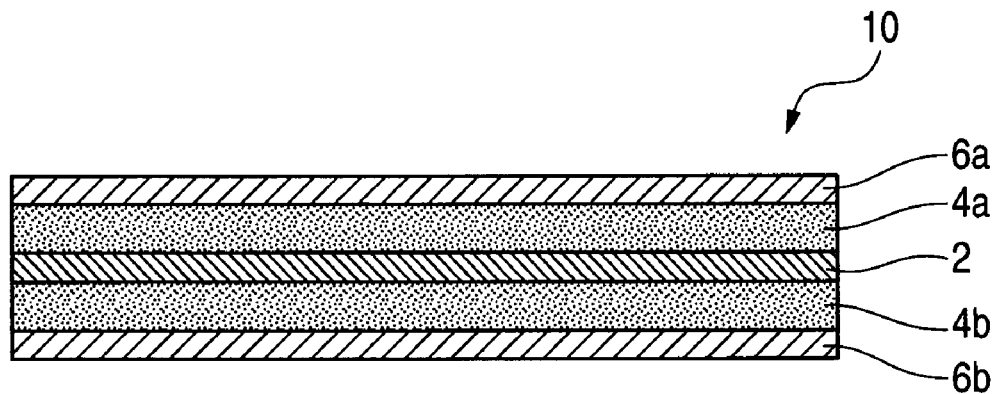
FIG. 1 is a sectional view illustrating a capacitor according to an embodiment which is an exemplary embodiment of the capacitor of the invention, wherein 2 denotes Separator, 4a and 4b denote Polarizable electrodes, 6a and 6b denote Collecting electrodes and 10 denotes Capacitor.

The carbon nanotube film of the invention, the process for the production thereof and the capacitor using the same will be described sequentially in detail hereinafter.

[Carbon Nanotube Film]

The carbon nanotube film of the invention includes in admixture a first carbon nanotube group which is an aggregate of carbon nanotubes and constitutes a network structure having these carbon nanotubes crosslinked to each other and a second carbon nanotube group which is an aggregate of carbon nanotubes having a diameter different from that of the carbon nanotubes of the first group.

The term "in admixture" as used herein is meant to indicate a concept including both the state in which the carbon nanotubes of the second carbon nanotube group are present dispersed in the gap between the carbon nanotubes of the first carbon nanotube group constituting the network structure having carbon nanotubes crosslinked to each other and the state in which the carbon nanotubes in the second carbon nanotube group constitute a network structure having carbon nanotubes crosslinked to each other with the carbon nanotubes in the first carbon nanotube group.

The term "network structure" as used herein is meant to indicate a state in which plural carbon nanotubes are crosslinked to other carbon nanotubes, resulting in the formation of a network as a whole. However, it is not necessarily required that all the carbon nanotubes be crosslinked to other carbon nanotubes. It suffices only if a network is formed as a whole.

Either the carbon nanotubes in the carbon nanotube group having a great diameter (hereinafter simply referred to as "great diameter carbon nanotube") or the carbon nanotubes in the other carbon nanotube group (hereinafter simply referred to as "small diameter carbon nanotube") among the first carbon nanotube group and the second carbon nanotube group may constitute a network structure. Alternatively, both the two carbon nanotube groups may be crosslinked to each other to form one network structure as a whole. In the case where the carbon nanotubes in only one of the two carbon nanotube groups constitute a network structure, the carbon nanotubes in the other carbon nanotube group are present in admixture with the carbon nanotubes in the former carbon nanotube group while being dispersed in the gap in the network structure.

(Carbon Nanotube)

Firstly, the carbon nanotube of the invention will be further described hereinafter.

In general, a carbon nanotube is a tube composed of hexagonal network graphene sheet of carbon extending parallel to the axis of the tube. The carbon nanotube is further classified. The one composed one graphene sheet is called single-walled carbon nanotube. On the other hand, the one composed of a multiple of graphene sheets is called multi-walled carbon nanotube. What structure of carbon nanotube is obtained is determined somewhat by the synthesis method or conditions.

The carbon nanotube to be used in the invention (hereinafter, when described regardless of which it has a small or great diameter, it may be either a small diameter carbon nanotube or a great diameter carbon nanotube) may be a single-walled carbon nanotube or a multi-walled carbon nanotube composed of two or more graphene sheets. Which should be used a single-walled carbon nanotube or a multi-walled carbon nanotube or whether or not both the two types of carbon nanotube should be used in admixture may be properly selected by the diameter of the carbon nanotubes used or the purpose of the carbon nanotube film to be formed or taking into account the cost.

Further, carbon nanotubes which are not in a hollow tube form strictly speaking such as carbon nanocoil (generally spiral coil form), carbon nanobead (generally spiral coil type carbon nanotube), carbon nanobead (carbon nanotube having a tube piercing a spherical bead made of amorphous carbon, etc.), cup stack type carbon nanotube and carbon nanotube covered by carbon nanohorn or amorphous carbon on the periphery thereof, too, can be used as carbon nanotube in the invention. The term "diameter of carbon nanotube" as used herein with reference to nanocoil is meant to indicate the diameter of the carbon nanotube constituting the coil rather than the diameter of "roll". The diameter of carbon nanotube with reference to nanobead indicates the diameter of the thickest portion rather than the diameter of the core piercing the bead.

Further, carbon nanotubes including some materials encapsulated therein such as metal-encapsulated carbon nanotube including a metal or the like encapsulated therein and peapod carbon nanotube having a fullerene or a metal-encapsulated fullerene encapsulated in carbon nanotube, too, can be used as carbon nanotube in the invention.

As mentioned above, in the invention, any form of carbon nanotubes such as these ordinary carbon nanotubes and their varieties and modifications can be used without any problems. Accordingly, all these forms of carbon nanotube are included in the concept of "carbon nanotube" in the invention.

The synthesis of these carbon nanotubes can be carried out by any of arc discharge method, laser ablation method and CVD method, which have heretofore been known. Thus, the synthesis method is not limited. Preferred among these methods is arc discharge method in a magnetic field because a high purity carbon nanotube can be synthesized.

The upper limit of diameter of those which are generically termed as "carbon nanotube" is about 100 nm. As the carbon nanotube to be used as great diameter carbon nanotube in particular in the invention, there may be used one having a diameter of from about 100 nm to 1,000 nm included in the category generically termed as carbon fiber. Therefore, the term "carbon nanotube" as used herein is meant to indicate a tube composed of (a) hexagonal network graphene sheet(s) of carbon extending parallel to the axis of the tube and having an upper diameter limit of 1,000 nm. However, the upper limit of diameter of carbon nanotube is preferably 500 nm or less, more preferably 200 nm or less taking into account availability, etc.

On the other hand, the lower limit of diameter of carbon nanotube is normally about 0.3 nm from the structural standpoint of view. However, when the diameter of the carbon nanotube is too small, it may be disadvantageous in that the yield in synthesis is reduced. Therefore, the lower limit of diameter of carbon nanotube is preferably 1 nm or more, more preferably 3 nm or more.

In the invention, the value of the diameter of the carbon nanotubes in the great diameter carbon nanotube group and in the small diameter carbon nanotube group are selected within the above defined range. In the two groups being an aggregate of carbon nanotubes, at least one of the two groups is an aggregate of carbon nanotubes and these carbon nanotubes are crosslinked to each other to form a network structure. The network structure may be formed by either or both of the aggregate of small diameter carbon nanotubes and the aggregate of great diameter carbon nanotubes.

In some detail, the diameter of the small diameter carbon nanotubes and the great diameter carbon nanotubes are not specifically limited so far as they fall within the above defined range and may be properly predetermined depending on the functionalities which are respectively expected for small diameter carbon nanotubes and great diameter carbon nanotubes. For example, in the case where as the polarizable electrode for capacitor (electric double-layer capacitor) described later there is used a carbon nanotube film of the invention, the diameter of the small diameter carbon nanotubes is preferably 50 nm or less, more preferably 20 nm or less so that a high capacitance can be assured. On the other hand, the lower limit of diameter of the small diameter carbon nanotubes is preferably 1 nm or more, more preferably 2 nm or more so that ions can be smoothly adsorbed thereto and desorbed therefrom, though depending on the diameter of electrolyte ions.

In the case where carbon nanotubes having a single diameter are used to form a crosslinked film, as the thickness of the crosslinked film increases, it is more likely that the effect of volumetric shrinkage during the film formation on the external shape can cause cracking or exfoliation from the film forming object. In the invention, however, two kinds of carbon nanotubes, i.e., those having a small diameter and a great diameter are present in the film, whereby the carbon nanotube having a great diameter acts as a skeleton of the film while the carbon nanotube having a small diameter exhibits the functions characteristic to carbon nanotube, making it possible to prevent the change of the external shape due to volumetric shrinkage during the film formation and making it less likely that the film can undergo cracking or exfoliation from the film forming object.

From this standpoint of view, the diameter of the great diameter carbon nanotubes is preferably from 5 to 100 times, more preferably from 10 to 50 times, even more preferably from 19 to 25 times that of the small diameter carbon nanotubes. The verification of the ratio of the diameter of the great diameter carbon nanotubes to the small diameter carbon nanotubes is made on the basis of the number-average diameter of the respective carbon nanotube groups. In order to measure the number-average diameter actually, the carbon nanotube film is observed under SEM (scanning electron microscope) (e.g., at 30,000× magnification). The diameter of great and small diameter carbon nanotubes within a predetermined field of view (e.g., region of 5 cm square) are actually counted to determine the number-average diameter thereof.

The proportion of the great and small diameter carbon nanotubes is not specifically limited. However, from the standpoint of the mechanism that the great diameter carbon nanotubes act as a skeleton of the film to prevent the change of external shape of the film due to volumetric shrinkage during the film formation, making it less likely that the film can undergo cracking or exfoliation from the film forming object and from the standpoint of expectation of various functions developed by the small diameter carbon nanotubes, the proportion of the great diameter carbon nanotubes in both the great and small diameter carbons is preferably from 5% to 95% by mass, more preferably from 10% to 90% by mass.

The proportion of the great and small diameter carbon nanotubes may be properly predetermined to fall within the above defined range depending on the functions required for carbon nanotube film. For example, in the case where as the polarizable electrode for capacitor there is used a carbon nanotube film of the invention and the combination of great and small diameter carbon nanotubes described in Example 1 later is selected, the proportion of the great diameter carbon nanotubes in both the great and small diameter carbon nanotubes is preferably from 50% to 75%, more preferably from 55% to 70% by mass from the standpoint of assurance of high capacitance.

In the case where the purity of the carbon nanotube to be used herein is not high enough, it is preferred that the carbon nanotube be previously purified to have a raised purity before the synthesis of the mixture described layer (purifying step). The method for the purification of carbon nanotube is not specifically limited. Any related art purifying methods may be employed.

(Network Structure)

As previously mentioned, either or both of the first carbon nanotube group and the second carbon nanotube constitute a network structure having carbon nanotubes crosslinked to each other. This network structure will be further described hereinafter.

The aforementioned network structure may be formed by any method so far as it is formed by crosslinking carbon nanotubes to each other such that a so-called "network structure" is formed. By way of example, those formed by the carbon nanotube film forming method described later.

In the case where only the carbon nanotube group composed of the great diameter carbon nanotubes constitutes a network structure, the great diameter carbon nanotubes are crosslinked to each other to form a crosslinked structure. In the case where only the carbon nanotube group composed of the small diameter carbon nanotubes constitutes a network structure, the small diameter carbon nanotubes are crosslinked to each other to form a crosslinked structure. In the case where both the two carbon nanotube groups constitute a network structure, the great and small diameter carbon nanotubes are randomly crosslinked to each other in admixture to form a crosslinked structure therebetween.

(Thickness of Carbon Nanotube Film)

While the thickness of the carbon nanotube film of the invention can be raised, it may be predetermined varying widely from extremely small value to great value. When the content of carbon nanotube in the dispersion to be used in Paragraph [Process for the production of carbon nanotube film] described later is lowered (simply by thinning the dispersion so that the viscosity thereof is lowered) and the dispersion is then spread to a small thickness, an extremely thin structure is then formed. Similarly, when the content of carbon in the dispersion is raised, a thick structure is then formed.

By repeating the supplying (spreading) of the dispersion, a thicker carbon nanotube film can be obtained. In the case where the invention is not applied, when this multi-layer spreading is repeated, the underlying layer which has been previously spread is dragged by the overlying layer which undergoes volumetric shrinkage at the crosslinking/drying step. As a result, the carbon nanotube film undergoes cracking and exfoliation. In accordance with the invention, the thickness of the layer developed by one time spreading can be raised. Further, the shrinkage of the external shape can be suppressed at the crosslinking/drying step. Therefore, even when multi-layer spreading is effected, the production process of the invention is more advantageous in the rise of the thickness of the spread.

[Process for the Production of Carbon Nanotube Film]

The process for the production of a carbon nanotube film of the invention (hereinafter occasionally referred to as "production process of the invention") includes a supplying step and a crosslinking step.

At the supplying step, there is used a dispersion having two carbon nanotube groups dissolved or dispersed in a liquid medium. The two carbon nanotube groups are an aggregate of carbon nanotubes having different diameters, and either or both of the groups is (are) an aggregate of carbon nanotubes having functional groups.

This dispersion resembles one disclosed as a solution (crosslinked solution) containing plural carbon nanotubes having functional groups bonded thereto in JP-A-2005-154887. The dispersion used in the production process of the present invention is prepared by further separately adding to the crosslinked solution in JP-A-2005-154887, a carbon nanotube group being an aggregate of carbon nanotubes having diameters which is different from that of "plural carbon nanotubes having functional groups bonded thereto" contained in the crosslinked solution. The carbon nanotube group to be separately added may or may not have functional groups.

Accordingly, the contents disclosed in JP-A-2005-154887 (e.g., Paragraphs 0071 to 0117 in JP-A-2005-154887) can be directly applied also to the dispersion in the production process of the invention. However, the content of carbon nanotube in the dispersion needs to be adjusted to be suitable for the spreading method as described later.

That is, in order to crosslink the functional groups in the carbon nanotube to each other to form a network structure in the production process of the invention, there are employed a first method in which a crosslinking agent is incorporated in the aforementioned dispersion so that the plural aforementioned functional groups are crosslinked to each other and a second method in which the plural aforementioned functional groups directly chemically bond to each other. These processes will be outlined hereinafter.

<Formulation of Dispersion>

(In the Case of the First Method)

In accordance with the first method involving the formation of a network structure with a crosslinking agent, the functional groups to be connected to carbon nanotube are not specifically limited so far as they can be chemically added to carbon nanotube and can undergo crosslinking reaction in the presence of any crosslinking agent. Any functional groups can be selected. Specific examples of the functional groups employable herein include —COOR, —COX, —MgX, —X (in which X is a halogen), —OR, —NR$^1$R$^2$, —NCO, —NCS, —COOH, —OH, —NH$_2$, —SH, —SO$_3$H, —R'CHOH, —CHO, —CN—, —COSH, —SR, and —SiR'$_3$ (in which R, R$^1$, R$^2$ and R' each independently represent a substituted or unsubstituted hydrocarbon group and are preferably each independently selected from the group consisting of —C$_n$H$_{2n-1}$, —C$_n$H$_{2n}$ and —C$_n$H$_{2n+1}$ in which n represents an integer of from 1 to 10, which may be substituted, preferably methyl or ethyl). However, the invention is not limited to these functional groups.

The amount of the functional groups to be introduced depends on the length and thickness of the carbon nanotube, which the carbon nanotube is single-walled or multi-walled, the kind of the functional group, the purpose of the composite material, etc. and thus cannot be unequivocally defined.

In the first method, the crosslinking agent is an essential component. As the crosslinking agent there may be used any crosslinking agent which can undergo crosslinking reaction with the aforementioned functional groups contained in the carbon nanotube. In other words, the kind of the crosslinking agent to be selected is somewhat limited depending on the kind of the aforementioned functional groups. Further, the combination of the functional group and the crosslinking agent causes the conditions of curing by crosslinking reaction (heating, ultraviolet irradiation, visible light irradiation, natural curing, etc.) to be automatically determined.

Specific preferred examples of the aforementioned crosslinking agent include polyols such as glycerin and ethylene glycol (generic term of organic compound having two or more OH groups), polyamines, polycarboxylic acids, polycarboxylic acid esters, polycarboxylic acid halides, polycarbodiimides, and polyisocyanates. At least one crosslinking agent selected from the group consisting of these compounds is preferably used. In this case, as the functional group there is selected one which can undergo crosslinking reaction with the crosslinking agent thus selected.

As the aforementioned crosslinking agent there may be used either a non-self-polymerizable crosslinking agent free of set of functional groups capable of causing polymerization reaction with each other therein such as glycerin, ethylene glycol, butenediol, hexinediol, hydroquinone and naphthalenediol or a self-polymerizable crosslinking agent having functional groups capable of causing polymerization reaction with each other therein (e.g., alkoxide).

In the aforementioned dispersion, the solvent is added in the case where the single use of the aforementioned crosslinking agent doesn't give sufficient spreadability. Accordingly, in the case of the first method, the crosslinking agent in liquid form and the additives which are optionally added are a liquid medium that constitutes the dispersion.

The solvent employable herein is not specifically limited and may be selected depending on the kind of the crosslinking agent used. Specific examples of the solvent employable herein include organic solvents such as methanol, ethanol, isopropanol, n-propanol, butanol, methyl ethyl ketone, toluene, benzene, acetone, chloroform, methylene chloride, acetonitrile, diethyl ether and tetrahydrofurane (THF), water, aqueous acid solutions, and aqueous alkali solutions. The added amount of such a solvent may be properly predetermined taking into account spreadability and thus is not specifically limited.

(In Case of the Second Method)

In accordance with the aforementioned second method in which the plural aforementioned functional groups directly chemically bond to each other without any crosslinking agent to form a crosslinking site, as the functional group contained in the carbon nanotube there may be selected any functional group without any limitation so far as it can be chemically added to carbon nanotube and can cause the functional groups to react with each other with or without any additives.

Specific examples of the functional groups employable herein include —COOR, —COX, —MgX, —X (in which X is a halogen), —OR, —NR$^1$R$^2$, —NCO, —NCS, —COOH, —OH, —NH$_2$, —SH, —SO$_3$H, —R'CHOH, —CHO, —CN—, —COSH, —SR, and —SiR'$_3$ (in which R, R$^1$, R$^2$ and R' each independently represent a substituted or unsubstituted hydrocarbon group). The invention is not limited to these compounds.

Examples of the reaction for chemically bonding the functional groups to each other include dehydration condensation, substitution reaction, addition reaction, and oxidation reaction. Exemplifying the functional groups by reaction, the following compounds are given. For condensation reaction, —COOR (in which R is a substituted or unsubstituted hydrocarbon group), —COOH, —COX (in which X is a halogen atom), —OH, —CHO, and —NH$_2$ may be used. For substitution reaction, —NH$_2$, —X (in which X is a halogen atom), —SH, —OH, —OSO$_2$CH$_3$ and —OSO$_2$(C$_6$H$_4$) CH$_3$ may be used. For addition reaction, —OH and —NCO may be used. For oxidation reaction, —SH may be used.

Alternatively, molecules some of which containing these functional groups may be bonded to carbon nanotubes so that they can be chemically bonded to each other at the aforementioned functional group sites.

In order to chemically bond the functional groups to each other, an additive capable of causing chemical bonding of the aforementioned functional groups to each other may be used. As such an additive there may be used any material which can cause the aforementioned functional groups contained in the carbon nanotube to react with each other. In other words, the kind of the additive to be selected is somewhat limited depending on the kind of the aforementioned functional group and the kind of the reaction. Further, the combination of the functional group and the reaction causes the conditions of curing by crosslinking reaction (heating, ultraviolet irradiation, visible light irradiation, natural curing, etc.) to be automatically determined.

In the case where the reaction for chemically bonding the aforementioned functional groups to each other is dehydration condensation, as the additive there may be added a condensation agent. Specific examples of the condensation agent employable herein include acid catalysts, and dehydration condensation agents such as sulfuric acid, N-ethyl-N'-(3-dimethylaminopropyl)carbodiimide and dicyclohexylcarbodiimide. In this case, as the aforementioned functional group there is selected one capable of causing reaction of the functional groups with each other with the condensation agent thus selected.

Examples of the aforementioned functional group to be used in dehydration condensation include —COOR (in which R is a substituted or unsubstituted hydrocarbon group), —COOH, —COX (in which X is a halogen atom), —OH, —CHO, and —$NH_2$.

In the case where the reaction for chemically bonding the aforementioned functional groups to each other is substitution reaction, as the aforementioned additive there may be added a base. The base to be added is not specifically limited and may be arbitrarily selected depending on the acidity of the hydroxyl group.

Specific examples of the base employable herein include sodium hydroxide, potassium hydroxide, pyridine, and sodium ethoxide. In this case, as the aforementioned functional group there is selected one which can cause substitution reaction of the functional groups with each other with the base thus selected.

Examples of the aforementioned functional group to be used in the substitution reaction include —$NH_2$, —X (in which X is a halogen), —SH, —OH, —$OSO_2CH_3$, and —$OSO_2(C_6H_4)CH_3$.

In the case where the reaction for chemically bonding the aforementioned functional groups to each other is addition reaction, additives are not necessarily needed. Examples of the aforementioned functional group to be used herein include —OH, and —NCO.

Also in the case where the reaction for chemically bonding the aforementioned functional groups to each other is oxidation reaction, additives are not necessarily needed. However, an oxidation accelerator may be added. Specific examples of the oxidation accelerator employable herein include iodine. As the functional group to be used herein there may be used —SH.

Functional groups are preferably selected from the group consisting of the functional groups already exemplified in such a combination that at least two functional groups can react with each other and then added to carbon nanotube.

The consideration of the content of the aforementioned carbon nanotube in the aforementioned dispersion is essentially the same as in the first method.

The content of the aforementioned additive in the aforementioned dispersion depends on the length and thickness of the carbon nanotube, which the carbon nanotube is single-walled or multi-walled, the kind and amount of the functional groups contained therein, whether or not the solvent or other additives are present, the kind and amount of the solvent or other additives, etc., not to mention the kind of the aforementioned additive (including which it is self-polymerizable or non-self-polymerizable) and cannot be unequivocally defined. In particular, glycerin, ethylene glycol, etc. have not too high a viscosity and thus can act also as a solvent. Therefore, these additives can be excessively added.

In the aforementioned dispersion, the solvent is added in the case where the single use of the aforementioned additive for binding the functional groups to each other doesn't give a sufficient spreadability. Accordingly, in the case of the second method, the additive in a liquid form and the solvent which is optionally added are a liquid medium constituting the dispersion. The solvent employable herein is not specifically limited and may be selected depending on the kind of the additive used. The specific kind and added amount of the solvent are the same as described in the first method with reference to solvent.

(Common to the First Method and the Second Method)

To the aforementioned dispersion medium are added the aforementioned carbon nanotubes having functional groups and a carbon nanotube group which is an aggregate of carbon nanotubes having a diameter different from that of the former carbon nanotubes. The carbon nanotube group to be added herein may or may not have functional groups and is properly selected depending on the structure of the carbon nanotube film to be produced. In the case where as the carbon nanotubes having a diameter different from that of the other there are added those having functional groups, carbon nanotubes having functional groups bonded thereto which are the same as mentioned above except different diameter may be used. Further, corresponding crosslinking agent or additives may be added as necessary.

In the case where both the great and small diameter carbon nanotubes to be used have functional groups, the introduction of functional groups into the carbon nanotubes can be effected at the same time in the presence of the great and small diameter carbon nanotubes.

The mixing proportion of the great and small diameter carbon nanotubes may coincide with the desired proportion of the two carbon nanotube groups in the carbon nanotube film.

The content of carbon nanotube in the aforementioned dispersion (carbon nanotube concentration) depends on the (mixing) proportion of the great and small diameter carbon nanotubes, the length and thickness of the carbon nanotubes, which the carbon nanotube is single-walled or multi-walled, the kind and amount of the functional group to be contained therein, the kind and amount of crosslinking agent or additive for binding the functional groups to each other, whether or not the solvent or other additives are present, the kind and amount of the solvent or other additives, etc., and thus cannot be unequivocally defined.

The optimum carbon nanotube concentration depends also on the method for spreading the dispersion. In the case where spin coating method, dip coating method or spray coating method, which is the most ordinary coating method, is employed, a relatively low concentration dispersion is desired. In this case, the specific proportion of carbon nanotube cannot be unequivocally defined as previously mentioned but is from about 0.01 to 10 g/l, preferably from about 0.1 to 5 g/l, more preferably from about 0.5 to 1.5 g/l based on the total amount of the dispersion as calculated in terms of the sum of the great and small diameter carbon nanotubes, excluding the mass of the functional groups.

Squeegee coating method, screen printing method, wire bar coating method, etc. are suitable for the spreading of a relatively high concentration dispersion. In this case, the specific proportion of carbon nanotube is from about 10 to 500 g/l, preferably from about 20 to 200 g/l, more preferably from about 40 to 150 g/l as calculated in terms of the sum of the great and small diameter carbon nanotubes.

(Other Additives)

The aforementioned crosslinked solution (including those produced by the first method and the second method) may include various additives such as viscosity adjustor, dispersant and crosslinking accelerator incorporated therein.

The viscosity adjustor is added in the case where the single use of the aforementioned crosslinking agent or additive for binding the functional groups to each other doesn't give a sufficient spreadability. The viscosity adjustor employable herein is not specifically limited and may be properly selected depending on the kind of the crosslinking agent or the additive for binding the functional groups to each other. Specific examples of the viscosity adjustor employable herein include methanol, ethanol, isopropanol, n-propanol, butanol, methyl ethyl ketone, toluene, benzene, acetone, chloroform, methylene chloride, acetonitrile, diethyl ether, and THF.

Among these viscosity adjustors are those which act as solvent depending on the added amount thereof. However, it is not significant to distinguish the two functions definitely. The added amount of such a viscosity adjustor may be properly predetermined taking into account spreadability and is not specifically limited.

The dispersant is added to retain the dispersion stability of carbon nanotube, crosslinking agent or functional group bonding additive in the crosslinked solution. As the dispersant there may be used any known surface active agent, water-soluble organic solvent, water, aqueous acid solution, aqueous alkali solution or the like. However, since the components of the aforementioned crosslinked solution have a high dispersion stability themselves, such a dispersant is not necessarily needed. Depending on the purpose of the carbon nanotube film finally obtained, it is occasionally required that no impurities such as dispersant be included. In this case, it goes without saying that the dispersant should not be added or should be added in an extremely small amount.

<Process for the Preparation of Dispersion>

The process for the preparation of the aforementioned dispersion to be used in the production process of the invention will be described hereinafter.

The aforementioned dispersion to be used in the production process of the invention is prepared by mixing a great diameter carbon nanotube group and a small diameter carbon nanotube group at least one of which is an aggregate of carbon nanotubes having functional groups with a crosslinking agent for causing crosslinking reaction with the aforementioned functional groups or optionally with an additive for chemically bonding the functional groups to each other, and then stirring the mixture.

In the dispersion, the carbon nanotubes are essentially dispersed. However, the carbon nanotubes having functional groups are regarded as being partly dissolved in the dispersion. In the following description, the terms "dispersed" and "dissolved" will not be definitely distinguished and will be described as "dispersed".

In the case where the carbon nanotube having functional groups is used as a starting material, the aforementioned procedure is effected to prepare the aforementioned dispersion. In the case where an ordinary carbon nanotube is used itself as a starting material, the aforementioned procedure may be preceded by a step of introducing functional groups into the carbon nanotube.

The process for the preparation of the dispersion will be sequentially described hereinafter beginning with the step of introducing functional groups into the carbon (addition step).

(Addition Step)

The addition step is a step of introducing desired functional groups into the carbon nanotube. In the case where functional groups are introduced into only the carbon nanotube group composed of either great or small diameter carbon nanotubes, the addition step is a procedure which is effected only for the carbon nanotube group. In the case where functional groups are introduced into both the great and small diameter carbon nanotube groups, both the carbon nanotube groups may be previously mixed in a desired proportion before the addition step. Of course, the addition step may be effected for each of the two carbon nanotube groups.

The method for introducing functional groups into the carbon nanotube depends on the kind of the functional groups to be introduced and thus cannot be unequivocally defined. Desired functional groups may be directly added to the carbon nanotube. However, to the carbon nanotube may be added easily addable functional groups which are then entirely or partly substituted or to which other functional groups are added to obtain desired functional groups.

Alternatively, the carbon nanotube may be given a mechanochemical force so that the graphene sheet on the surface of the carbon nanotube is extremely partly destroyed or modified. Various functional groups are then introduced into the destroyed or modified part of the graphene sheet.

Further, the use of a carbon nanotube having many defects on the surface thereof at and after the time of production such as cup stack type carbon nanotube and carbon nanotube produced by gas phase growth method makes it easy to introduce functional groups into the carbon nanotube.

The addition procedure is not specifically limited. Any known method may be employed. Various methods are disclosed in Patent Reference 4. These methods can be employed also in the invention depending on the purpose.

The addition step will be further described with reference to the case where the functional group to be introduced is —COOR (in which R represents a substituted or unsubstituted hydrocarbon group and is preferably selected from the group consisting of —$C_nH_{2n-1}$, —$C_nH_{2n}$ and —$C_nH_{2n+1}$ in which n represents an integer of from 1 to 10, which may be substituted).

In order to introduce —COOR (in which R is as defined above) into the carbon nanotube, to the carbon nanotube may be added a carboxyl group (step (i)) which is then esterified (step (ii)).

(i) Addition of Carboxyl Group

In order to introduce a carboxyl group into the carboxyl group, the carboxyl group may be refluxed with an oxidizing acid. This procedure is relatively easy and allows the addition of a carboxyl group rich in reactivity to advantage. This procedure will be briefly described hereinafter.

Examples of the oxidizing acid employable herein include concentrated nitric acid, aqueous hydrogen peroxide, mixture of sulfuric acid and nitric acid, and aqua regia. In particular, the concentration of concentrated nitric acid, if used, is 5% by mass or more. Refluxing may be effected by any ordinary method. For example, when concentrated nitric acid is used, the refluxing temperature is from about 120° C. to 130° C. and the refluxing time is from about 30 minutes to 20 hours.

The reaction solution obtained after refluxing includes a carbon nanotube having a carboxyl group added thereto (carbon nanotube carboxylic acid). Thus, when the reaction solution is allowed to cool to room temperature, and then optionally subjected to separation and cleaning, the desired carbon nanotube carboxylic acid can be obtained.

(ii) Esterification

By adding an alcohol to the carbon nanotube carboxylic acid thus obtained, and then dehydrating the carbon nanotube carboxylic acid so that it is esterified, the desired functional group —COOR (in which R is a substituted or unsubstituted hydrocarbon group which is as previously described with reference to its preferred examples) can be introduced into the carbon nanotube.

The alcohol to be used in esterification is determined by R in the general formula of the functional group. In other words, when R is $CH_3$, the alcohol is methanol. When R is $C_2H_5$, the alcohol is ethanol.

In general, esterification is effected in the presence of a catalyst. In the invention, too, any known related art catalyst such as sulfuric acid, hydrochloric acid and toluenesulfonic acid may be used.

The aforementioned esterification of carbon nanotube carboxyl group may be carried out by refluxing the carbon nanotube carboxylic acid with an alcohol and a catalyst at a proper temperature for a proper period of time. The temperature and time conditions under which esterification is effected depend on the kind of the catalyst and alcohol used, etc. and thus cannot be unequivocally defined. However, when methanol is used, the refluxing temperature is from about 60° C. to 70° C. and the refluxing time is from about 1 to 20 hours.

By separating the reaction product from the reaction solution obtained after esterification, and then optionally cleaning the reaction product, a carbon nanotube having a functional group —COOR (in which R is a substituted or unsubstituted hydrocarbon group which is as previously described with reference to its preferred examples) can be obtained.

(Mixing Step)

The mixing step is a step of mixing the carbon nanotube group composed of the obtained carbon nanotubes having functional groups with the followings to prepare a crosslinked solution: a carbon nanotube group having a diameter different from that of the former; a crosslinking agent for causing crosslinking reaction with the functional groups if needed; and an additive for binding functional groups to each other if needed. In the case where the addition step includes previously mixing the great and small carbon nanotube groups, and then introducing functional groups into the mixture, it is not necessary that a carbon nanotube group free of functional group be separately added.

At the mixing step, there are added the two carbon nanotube groups, the crosslinking agent or additive for binding functional groups and the solvent, and optionally other additives already described in Clause (Other additives), etc. Preferably, the mixing proportion of the various components is adjusted taking into account spreadability to prepare a crosslinked solution which is ready to be supplied onto (spread over) the substrate.

The mixing of these components may be carried out merely by stirring with a spatula or by stirring using various wet dispersing machines such as mortar, sandmill and bead mill, agitating blade agitator, magnetic stirrer and agitating pump. In order to disperse the carbon nanotube more uniformly so that the storage stability can be enhanced or a network structure developed by crosslinking carbon nanotubes can be extended throughout the entire carbon nanotube, an ultrasonic dispersing machine or homogenizer may be used to disperse the mixture vigorously.

Thus, the dispersion to be used in the production process of the invention is prepared.

<Various Steps of Producing Carbon Nanotube Film>

By subjecting the dispersion thus obtained to the production process of the invention involving the supplying step and the crosslinking step as previously mentioned, the carbon nanotube film of the invention can be produced.

The contents disclosed in Patent Reference 3 (e.g., Paragraphs 0141 to 0146 in Patent Reference 3) can be directly applied also to the various procedures in the production process of the invention.

The various steps will be each outlined hereinafter.

<Supplying Step>

At the supplying step, the dispersion thus prepared above is supplied onto the surface of the film forming object. At the supplying step, the aforementioned dispersion must be supplied onto the entire surface of the aforementioned film forming object.

At the present step, the supply of the dispersion may be carried out merely by spreading the dispersion over the surface of the aforementioned film forming object.

The spreading method is not specifically limited. Any of a wide variety of spreading methods such as method of merely dropping a droplet which is then spread by a squeegee and ordinary coating methods may be employed. Examples of ordinary coating methods include spin coating method, wire bar coating method, cast coating method, roll coating method, brush coating method, dip coating method, spray coating method, and curtain coating method.

<Crosslinking Step>

At the crosslinking step, the functional groups in the carbon nanotube having functional groups are chemically bonded to each other to form a network structure having carbon nanotubes crosslinked to each other. In the case where one of the great and small diameter carbon nanotube groups has functional groups, the carbon nanotubes in that carbon nanotube group are crosslinked to each other to form a network structure. In the case where both the great and small diameter carbon nanotube groups have functional groups, all the carbon nanotubes are crosslinked to each other to form a network structure.

In the case where the procedure of the crosslinking step causes a liquid medium to be left in the carbon nanotube layer, the carbon nanotube layer may be dried to complete the desired carbon nanotube film. Though depending on the procedure for chemical bonding at the crosslinking step, if heat curing is effected, heating may be continued until the liquid medium is evaporated to dry the carbon nanotube layer.

The region where the aforementioned dispersion should be cured at the crosslinking step to form a carbon nanotube film may merely contain a desired region. It is not necessarily required that all the dispersion which has been supplied onto the surface of the aforementioned film forming object be cured.

The procedure at the crosslinking step is automatically determined depending on the combination of the aforementioned functional group and the aforementioned crosslinking agent (in the case of the first method) or the kind of the aforementioned functional group or the combination thereof with the aforementioned additive for binding functional groups to each other (in the case of the second method). For example, in the case where heat curing is combined, various heaters may be used to effect heating. In the case where ultraviolet curing is combined, the carbon nanotube dispersion may be irradiated with light from ultraviolet lamp or may be allowed to stand under the sun. Of course, the term "allowed to stand" is interpreted as one of procedures which are effected at the crosslinking step of the invention.

In the case where a carbon nanotube having a functional group —COOR added thereto (in which R is a substituted or unsubstituted hydrocarbon group) and a polyol (e.g., glycerin, ethylene glycol) are combined, heat curing (polyesterification by ester exchange reaction) is effected. Heating causes —COOR in the esterified carbon nanotube carboxylic acid and R'—OH in the polyol (in which R' is a substituted or unsubstituted hydrocarbon group) to undergo ester exchange reaction. Subsequently, a plurality of such reactions proceed on multiple basis to cause carbon nanotubes to be crosslinked.

Finally, a carbon nanotube film having a network structure having carbon nanotubes connected to each other is formed. Since the carbon nanotube film thus formed has a crosslinked structure formed between carbon nanotubes, a rigid structure can be formed as a whole.

[Capacitor]

The capacitor of the invention which is one of the applications of the carbon nanotube film of the invention will be described hereinafter. The capacitor of the invention is a so-called electric double-layer capacitor using a carbon nanotube film of the invention described above as a polarizable electrode that constitutes the capacitor.

FIG. 1 is a sectional view illustrating a capacitor according to an embodiment which is an exemplary embodiment of the capacitor of the invention. As shown in FIG. 1, the capacitor 10 according to the present embodiment includes a pair of polarizable electrodes 4a, 4b provided on the respective side of a separator (separation membrane) 2 and a pair of collecting electrodes 6a, 6b provided on the respective outer side of the pair of polarizable electrodes. As the polarizable electrodes 4a, 4b there are used a carbon nanotube film of the invention described above impregnated with an electrolyte.

The carbon nanotube film is formed as previously mentioned. During this procedure, a carbon nanotube film is formed on each of the collecting electrodes 6a, 6b as a film forming object to form a pair of polarizable electrodes 4a, 4b which are then stuck to each other with a separator 2 interposed therebetween to obtain the capacitor 10 according to the present embodiment.

The thickness of the carbon nanotube film is not specifically limited but is preferably somewhat great to realize a high capacitance, preferably 5 μm or more, more preferably 50 μm or more. On the other hand, the upper limit of the thickness of the carbon nanotube film is preferably 1,000 μm or less, more preferably 500 μm or less from the standpoint of prevention of cracking or exfoliation.

In order to raise the capacitance, it is essential that the specific surface area of the carbon nanotube film be as great as possible while the thickness of the carbon nanotube film remains the same. In other words, it is essential that the area where electrolyte ions can be adsorbed be as great as possible. To this end, the diameter of the carbon nanotubes is as small as possible to advantage. The lower limit of the diameter of the carbon nanotubes is about 0.3 nm from the structural standpoint of view. However, the lower limit of the diameter of the carbon nanotubes is preferably 2 nm or more to allow smooth adsorption/desorption of electrolyte ions, though depending on the diameter of the electrolyte ions used. The upper limit of the diameter of the carbon nanotubes is preferably 50 nm or less to obtain a great specific surface area.

The separator 2 is required to allow the passage of ions while preventing the electrical contact of the two electrodes between which it is interposed. In some detail, a microporous film such as paper separator, glass fiber separator, resin separator (e.g., polytetrafluoroethylene (PTFE), polypropylene (PP), polyethylene (PE)) and nonwoven cloth may be used.

The collecting electrodes 6a, 6b each are made of various electrically-conductive materials such as metal (e.g., aluminum, gold, silver, copper, platinum, stainless steel) and electrically-conductive resin. These electrically-conductive materials in sheet-like form, thin film or foil form may be used as a collecting electrode.

The electrolyte with which the carbon nanotube film is impregnated is a liquid containing ions which are adsorbed to the surface of the polarizable electrodes to form an electric double-layer thereon. Materials which are normally used as an electrolyte for electric double-layer capacitor may be used. Specific examples of the electrolyte employable herein include aqueous electrolytes such as sulfuric acid ($H_2SO_4$) and potassium hydroxide (KOH), and organic electrolytes obtained by mixing tetraethylammonium tetrafluoroborate (TEA), triethylmethylammonium tetrafluoroborate (TEMA) or the like with a solvent such as propylene carbonate. Further examples of the electrolyte employable herein include ionic liquids which are a normally soluble salt (salt which stays liquid at ordinary temperature), e.g., butylmethyl imidazolium tetrafluoroborate ($BMI-BF_4$), propylpyridinium tetrafluoroborate ($PP-BF_4$).

The basic configuration of the capacitor is as described above. In order to prevent the entrance of external air or water content, assure the self-supporting properties of capacitor or prevent the leakage or evaporation of the electrolyte, it is normally practiced to protect the capacitor by an exterior material, e.g., by encapsulating the entire capacitor in a laminate film packaging material or any sealable vessel such as aluminum casing or sealing around the capacitor with a resin material. Alternatively, the collecting electrodes 6a, 6b may be formed in a thin film on the surface of a substrate. These collecting electrodes 6a, 6b are then used to prepare a capacitor 10. The periphery of the substrate is then sealed to encapsulate the capacitor 10. The cell configuration of the capacitor is properly selected depending on the purpose. Typically, laminated type is adapted for high voltage use. Coin type is adapted for miniaturization. Cylindrical type prepared by winding a basic structure is adapted for large capacitance. Rectangular type (laminate) is adapted for low resistivity/small weight.

While the carbon nanotube film of the invention, the process for the production thereof and the capacitor using the same have been described, the invention is not limited to these specific embodiments. Various changes and modifications can be made therein according to the knowledge of the related art. It goes without saying that any changes or modifications fall within the scope of the invention so far as the constitutions of the invention are provided therein.

EXAMPLE

Examples will be described hereinafter. It goes without saying that the invention is not limited to the following examples.

Example 1

(1-1: Introduction of Functional Groups into Small Diameter Carbon Nanotube)

Figure 2:
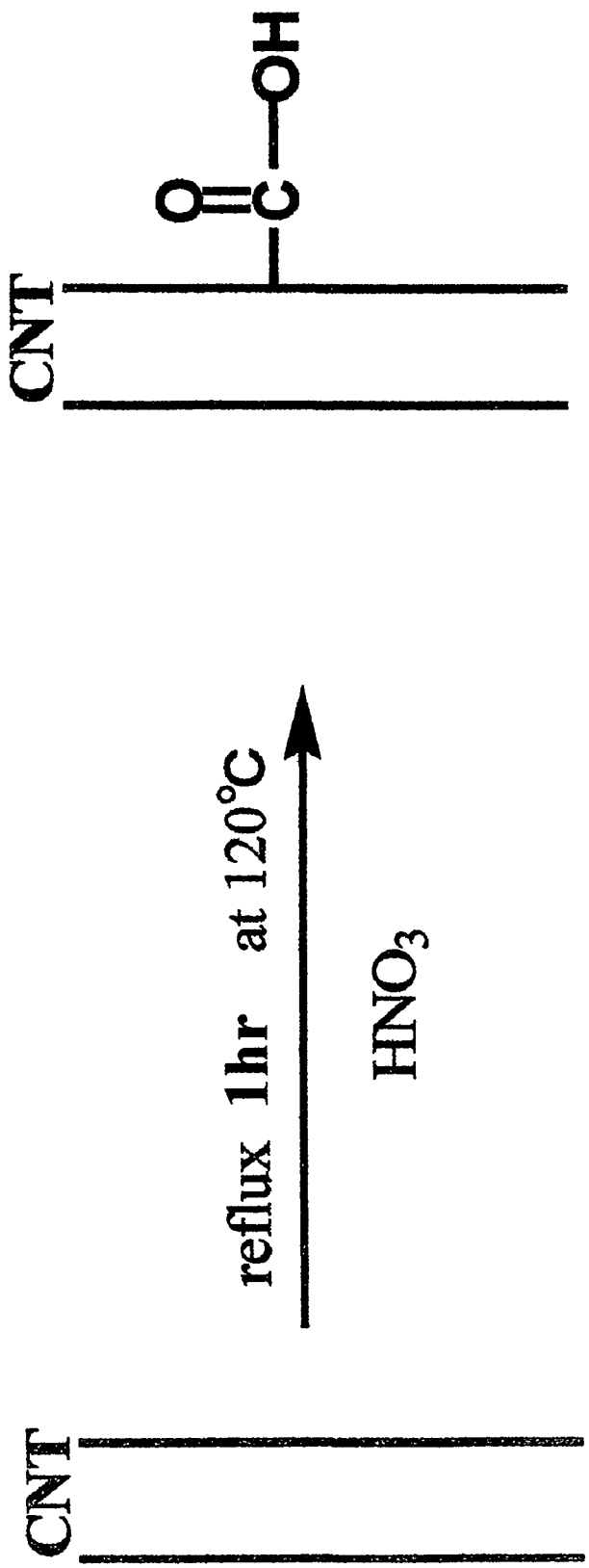
FIG. 2 depicts the reaction scheme of synthesis of carbon nanotube carboxyl acid in Clause (Introduction of functional groups into small diameter carbon nanotube) in Example 1.

500 mg of a multi-walled carbon nanotube powder (produced by Aldrich Inc.; purity: 90%; diameter: 5 nm to 30 nm (number-average diameter: 8 nm); length: 0.5 to 200 μm) and 50 ml of concentrated nitric acid (60 wt-% aqueous solution produced by KANTO CHEMICAL CO., INC.) are refluxed at 120° C. for 1 hour to add —COOH group to the surface of the multi-walled carbon nanotube. This reaction scheme is shown in FIG. 2. In FIG. 2, the moiety of carbon nanotube (CNT) is represented by two parallel lines (This applies also to other diagrams concerning the reaction scheme).

The temperature of the reaction solution is returned to room temperature. The reaction solution is then subjected to centrifugal separation at 5,000 rpm for 15 minutes so that the supernatant liquid and the precipitate are separated from each other. The precipitate recovered is dispersed in 10 ml of purified water, and then again subjected to centrifugal separation at 5,000 rpm for 15 minutes so that the supernatant liquid and the precipitate are separated from each other (Cleaning is effected once). This cleaning procedure is then repeated five times. Finally, the precipitate is recovered.

The precipitate thus recovered is then measured for infrared absorption spectrum. For comparison, the multi-walled carbon nanotube material is itself measured for infrared absorption spectrum. The comparison of the two spectra shows that an absorption at 1,735 $cm^{-1}$ characteristic to carboxylic acid which is not observed with the multi-walled carbon nanotube material itself is observed with the aforementioned precipitate. This demonstrates that the reaction of the carbon nanotube with nitric acid causes a carboxyl group to be introduced into the carbon nanotube. In other words, it is confirmed that the precipitate is a carbon nanotube carboxylic acid.

When the precipitate thus recovered is added to neutral purified water, it is then confirmed that the precipitate has a good dispersibility. This result supports the result of infrared absorption spectrum that a hydrophilic carboxyl group has been introduced into the carbon nanotube.

Figure 3:
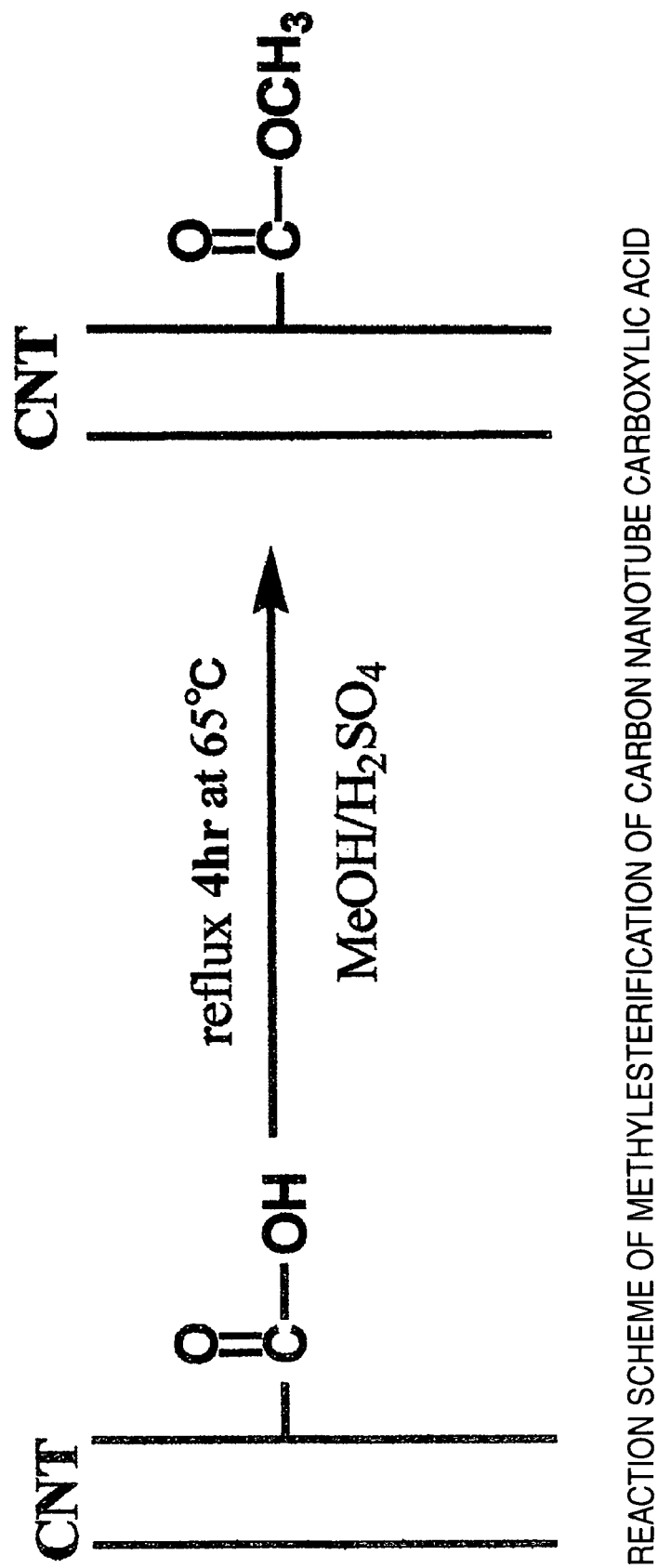
FIG. 3 depicts the reaction scheme of esterification in Clause (Introduction of functional groups into small diameter carbon nanotube) in Example 1.

490 mg of the carbon nanotube carboxylic acid thus obtained is then added to 50 ml of methanol (produced by Wako Pure Chemical Industries, Ltd.). To the mixture is then added 2 ml of concentrated sulfuric acid (98% by mass, produced by Wako Pure Chemical Industries, Ltd.). The mixture is then refluxed at 65° C. for 4 hours to cause methylesterification of the carbon nanotube carboxylic acid. The aforementioned reaction scheme is shown in FIG. 3.

The temperature of the reaction solution is then returned to room temperature. The reaction solution is filtered to withdraw the precipitate which is then washed with water and recovered. The precipitate thus recovered is then measured for infrared absorption spectrum. As a result, an absorption at a range of 1,735 $cm^{-1}$ and from 1,000 to 1,300 $cm^{-1}$ characteristic to ester is observed. It is thus confirmed that the carbon nanotube carboxylic acid has been esterified. Thus, a methylesterified carbon nanotube A is obtained.

(1-2: Introduction of Functional Groups into Great Diameter Carbon Nanotube)

The great diameter multi-walled carbon nanotube is subjected to introduction of functional groups in the same manner as mentioned above. In some detail, a methylesterified carbon nanotube B is obtained in the same manner as in Clause (1-1: Introduction of functional groups into small diameter carbon nanotube) except that the carbon nanotube used is a multi-walled carbon nanotube powder (produced by MTR: purity: 90%; diameter: 150 to 300 nm (number-average diameter: 200 nm); length: 5 μm to 200 μm).

(2: Preparation of Dispersion)

8 mg of the methylesterified carbon nanotube A thus prepared, 8 mg of the methylesterified carbon nanotube B and 0.2 ml of glycerin are mixed in a mortar to prepare a paste-like functionalized carbon nanotube dispersion J1.

(Formation of Carbon Nanotube Film)

The functionalized carbon nanotube dispersion J1 thus obtained is spread over two sheets of aluminum foil collecting electrode (width: 10 mm; length: 20 mm; thickness: 30 μm) to a thickness of 0.5 mm using a squeegee.

Figure 4:
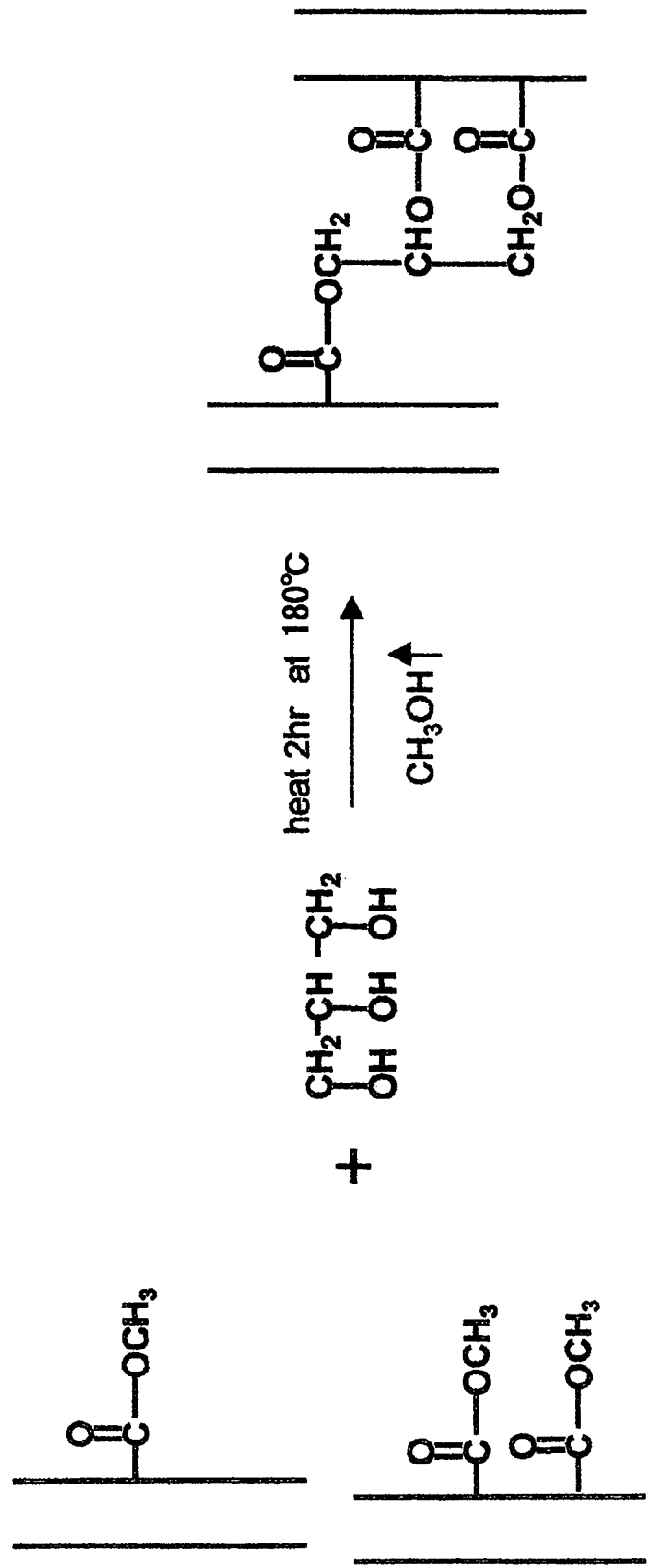
FIG. 4 depicts the reaction scheme of crosslinking involving ester exchange reaction in Clause (Introduction of functional groups into small diameter carbon nanotube) in Example 1.

The liquid film of functionalized carbon nanotube dispersion J1 thus spread is then heated to 180° C. for 2 hours together with the aluminum foil collecting electrode so that glycerin and —$COOCH_3$ group in methylesterified carbon nanotubes A and B are subjected to crosslinking reaction. This reaction scheme is shown in FIG. 4.

Figure 5:
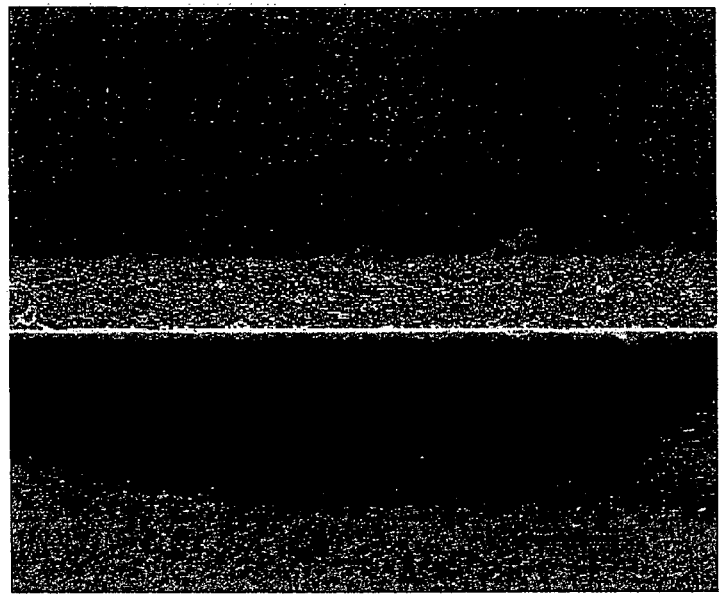
FIG. 5 is a view showing a scanning electron microphotograph (150× magnification) of a section of the carbon nanotube film obtained in Example 1.

At the same time, the glycerin which has not taken part in the reaction is evaporated to form a polarizable electrode (free of electrolyte) made of carbon nanotube film. In order to examine the carbon nanotube film thus obtained for thickness and film structure, a polarizable electrode is prepared in the same manner as mentioned above. The carbon nanotube film is peeled off the aluminum foil collecting electrode. The carbon nanotube film thus peeled is then observed for section under SEM (scanning electron microscope). SEM photograph (150× magnification) of the section of the carbon nanotube film is shown in FIG. 5. SEM photograph in FIG. 5 shows that the thickness of the carbon nanotube film is 67 μm.

Figure 6:
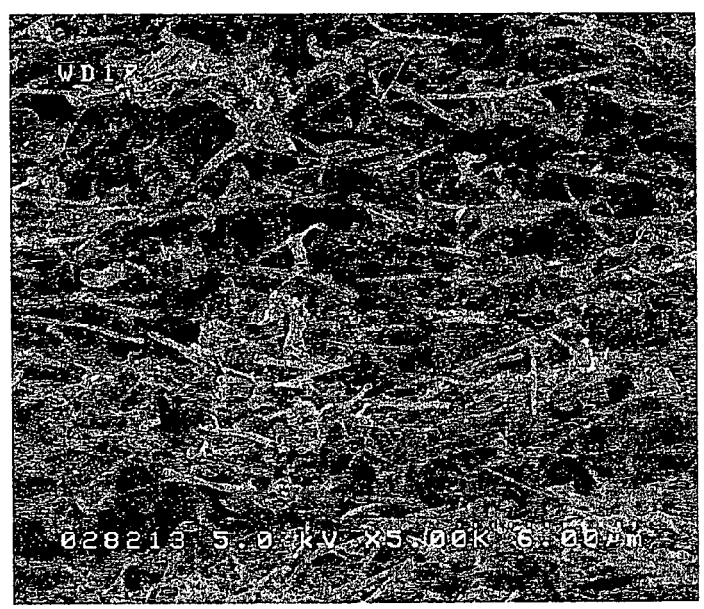
FIG. 6 is a view showing a scanning electron microphotograph (5,000× magnification) of a section of the carbon nanotube film obtained in Example 1.
Figure 7:
FIG. 7 is a view showing a scanning electron microphotograph (30,000× magnification) of a section of the carbon nanotube film obtained in Example 1.

An enlarged image of SEM photograph is shown in FIG. 6 (5,000× magnification) and FIG. 7 (30,000× magnification). As can be seen in these enlarged images, the small diameter carbon nanotubes constitute a fine network filling the space formed by the network structure of the great diameter carbon nanotubes.

(3: Assembly of Capacitor)

Two sheets of the thus obtained aluminum foil collecting electrode having a carbon nanotube film formed thereon as a polarizable electrode are then dried at 280° C. in vacuum for 2 hours.

The two sheets of the aluminum foil collecting electrode are laminated on each other with a paper separator (TF40-35, produced by NIPPON KODOSHI CORPORATION) interposed therebetween in a globe box the interior of which has been kept at a dew point of −55° C. in such an arrangement that the carbon nanotube film thereof are disposed thereinside. The laminate is then inserted in a laminate film packaging material into which 0.2 ml of an electrolyte (BMI-$BF_4$: 1-Butyl-3-methylimidazolium tetrafluoroborate) is then injected. Using a heat sealer, the film is then welded to each other at the periphery of the laminate to prepare an electric double-layer capacitor.

(4-1: Measurement of Chargeability/Dischargeability)

The capacitor thus obtained is then charged and discharged between 0 V and 2.5 V to evaluate the properties thereof. Charge and discharge are effected with a current of 10 mA. As a result, the capacitance per cell (10 mm×20 mm=2 $cm^2$) is 49 mF.

(4-2: Test on Thickness Increase)

Using a squeegee (gap: 1,000 μm), the functionalized carbon nanotube dispersion J1 prepared in Clause (2: Preparation of dispersion) is spread over an inclined slide glass substrate (25 mm×75 mm×1 mm) (angle of inclination: 0.76°) to form a liquid film having a thickness gradient thereon. The thickness of the liquid film varies gradually from 0 μm to 1,000 μm (dried thickness: 0 μm to 300 μm).

The liquid film thus obtained is then heated to 180° C. together with the slide glass for 2 hours so that glycerin and —$COOCH_3$ group in the methylesterified carbon nanotubes A and B are subjected to crosslinking reaction with each other and the liquid film is dried.

The carbon nanotube film thus obtained is then measured for thickness at the thickest portion in the cracked site. The result is 92 μm.

Examples 2 and 3 and Comparative Examples 1 and 2

The procedure of Example 1 is followed up to the step of (1-2: Introduction of functional groups into great diameter carbon nanotube) to obtain methylesterified carbon nanotubes A and B.

At the step of (2: Preparation of dispersion), various dispersions are prepared according to the formulations set forth in Table 1 below.

length: 5 µm to 200 µm) and 0.2 ml of glycerin are mixed in a mortar to prepare a paste-like functionalized carbon nanotube dispersion J4.

TABLE 1

| | | | Unit | Example 1 | Example 2 | Example 3 | Comparative Example 1 | Comparative Example 2 |
|---|---|---|---|---|---|---|---|---|
| Formulation of functionalized carbon nanotube dispersion | Added amount | Methylesterified carbon nanotube A (small diameter) | mg | 8 | 6 | 6.4 | 8 | 0 |
| | | Methylesterified carbon nanotube B (great diameter) | mg | 8 | 2 | 19.2 | 0 | 30 |
| | | Glycerin | ml | 0.2 | 0.2 | 0.2 | 0.2 | 0.2 |
| | | Mixing proportion of great diameter carbon nanotube | % by mass | 50 | 25 | 75 | 0 | 100 |
| | | Carbon nanotube concentration | mg/ml | 80 | 40 | 128 | 40 | 150 |
| | Thickness of carbon nanotube film | | µm | 67 | 17 | 165 | 7 | 300 |
| | Capacitance per cell (2 cm$^2$) | | mF | 49.1 | 28.7 | 47.0 | 15 | 28.9 |
| | Results of test on thickness increase | | µm | 92 | 39 | 220 | 12 | 300 or more |

Subsequently, the various functionalized carbon nanotube dispersions are each processed in the same manner as in Clause (Formation of carbon nanotube film) in Example 1 to prepare carbon nanotube films which are each then used to assemble capacitors in the same manner as in Clause (3: Assembly of capacitor). These capacitors are each then measured for capacitance per cell in the same manner as in Clause (4-1: Measurement of chargeability/dischargeability). The results are as set forth in Table 1 above.

Further, the various functionalized carbon nanotube dispersions are each subjected to test on thickness increase in the same manner as in Clause (4-2: Test on thickness increase) in Example 1. The results are as set forth in Table 1 above.

Figure 8:
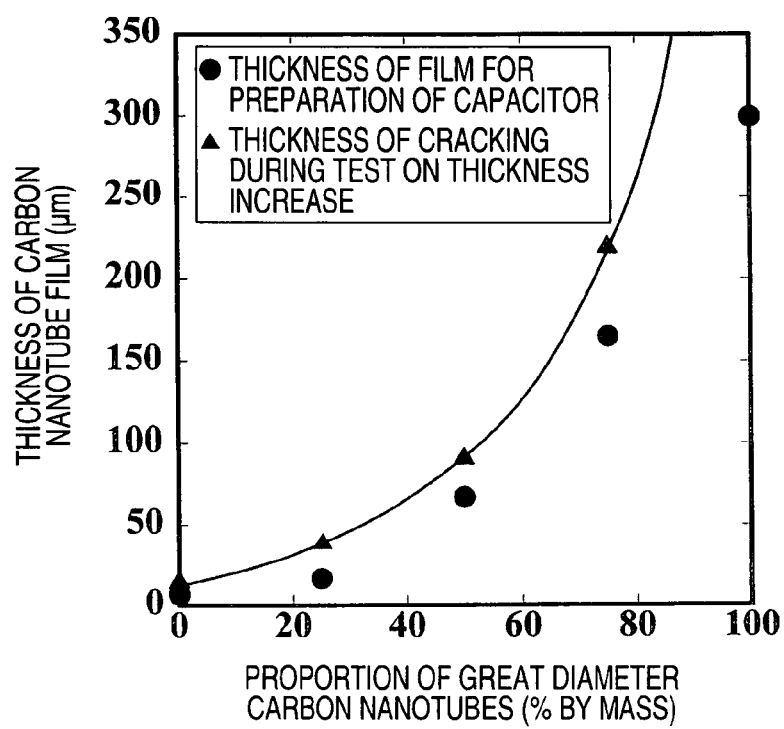
FIG. 8 is a graph illustrating the results of test on thickness increase in the examples and comparative examples wherein the abscissa depicts the proportion (% by mass) of great diameter carbon nanotubes and the ordinate depicts the thickness (μm) of carbon nanotube film.

The results of the test on thickness increase, including that of Example 1, are shown in the graph of FIG. 8. In the graph of FIG. 8, the abscissa depicts the proportion of great diameter carbon nanotubes (% by mass) and the ordinate depicts the thickness of the carbon nanotube film (µm). The results of test on thickness increase are plotted by solid triangle. A curved line extends through these plots. The thickness of the carbon nanotube films (free of cracking) used to assemble the capacitors are plotted by solid circle.

The product of Comparative Example 2 undergoes no film cracking under these conditions of test on thickness increase.

Figure 9:
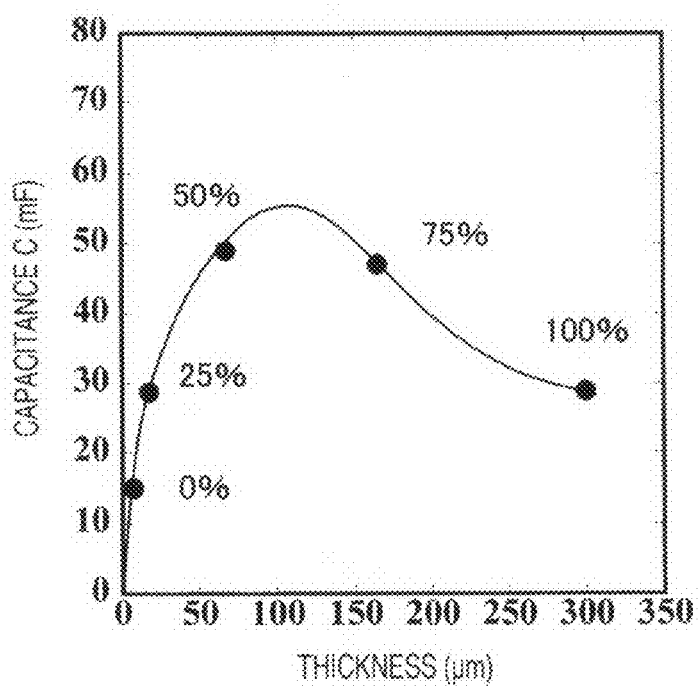
FIG. 9 is a graph illustrating the results of measurement of the capacitance of the capacitors in the examples and comparative examples per cell wherein the abscissa depicts the thickness (μm) of carbon nanotube film (polarizable electrode) and the ordinate depicts the capacitance (mF) per cell.

The results of measurement of capacitance of capacitor per cell, including that of Example 1, are shown in the graph of FIG. 9. In the graph of FIG. 9, the abscissa depicts the thickness of carbon nanotube film (polarizable electrode) (µm) and the ordinate depicts the capacitance per cell (mF). The results of measurement are plotted by solid triangle. A curved line extends through these plots.

Example 4

The procedure of Example 1 is followed up to the step of (2: Preparation of dispersion) except that instead of the step of (1-2: Introduction of functional groups into great diameter carbon nanotube), a multi-walled carbon nanotube having no functional groups incorporated therein is used at the step of (2: Preparation of dispersion).

In some detail, the procedure after the step (2: Preparation of dispersion) is effected as follows.

8 mg of a methylesterified carbon nanotube A prepared in the same manner as in Example 1, 8 mg of a multi-walled carbon nanotube powder (produced by MTR: purity: 90%; diameter: 150 to 300 nm (number-average diameter: 200 nm);

The functionalized carbon nanotube dispersion J4 thus obtained is then processed in the same manner as in Clause (Formation of carbon nanotube film) in Example 1 to form a carbon nanotube film. The thickness of the carbon nanotube film thus formed has a thickness of 160 µm.

Subsequently, the carbon nanotube film thus obtained is processed in the same manner as in Clause (3: Assembly of capacitor) in Example 1 to prepare a capacitor which is then measured for capacitance per cell in the same manner as in Clause (4-1: Measurement of chargeability/dischargeability) in Example 1. As a result, the cell capacitance is found to be 54 mF.

Example 5

The procedure of Example 1 is followed up to the step of (2: Preparation of dispersion) except that instead of the step of (1-1: Introduction of functional groups into small diameter carbon nanotube), a multi-walled carbon nanotube having no functional groups incorporated therein is used at the step of (2: Preparation of dispersion).

In some detail, the procedure after the step (2: Preparation of dispersion) is effected as follows.

8 mg of a multi-walled carbon nanotube powder (produced by Aldrich Inc.; purity: 90%; number-average diameter: 8 nm; average length: 0.5 to 200 µm), 8 mg of the methylesterified carbon nanotube B prepared in Example 1 and 0.2 ml of glycerin are mixed in a mortar to prepare a paste-like functionalized carbon nanotube dispersion J5.

The functionalized carbon nanotube dispersion J5 thus obtained is then processed in the same manner as in Clause (Formation of carbon nanotube film) in Example 1 to form a carbon nanotube film. The thickness of the carbon nanotube film thus formed has a thickness of 120 µm.

Subsequently, the carbon nanotube film thus obtained is processed in the same manner as in Clause (3: Assembly of capacitor) in Example 1 to prepare a capacitor which is then measured for capacitance per cell in the same manner as in Clause (4-1: Measurement of chargeability/dischargeability) in Example 1. As a result, the cell capacitance is found to be 49 mF.

Example 6

The procedure of Example 1 is followed up to the step of (1-2: Introduction of functional groups into great diameter carbon nanotube) to obtain methylesterified carbon nanotubes A and B.

In some detail, the procedure after the step (2: Preparation of dispersion) is effected as follows.

1 mg of the methylesterified carbon nanotube A prepared in the same manner as in Example 1, 9 mg of the methylesterified carbon nanotube B prepared in the same manner as in Example 1 and 0.1 ml of glycerin are mixed in a mortar to prepare a paste-like functionalized carbon nanotube dispersion J6.

The functionalized carbon nanotube dispersion J6 thus obtained is then processed in the same manner as in Clause (Formation of carbon nanotube film) in Example 1 to form a carbon nanotube film. The thickness of the carbon nanotube film thus formed has a thickness of 240 µm.

Subsequently, the carbon nanotube film thus obtained is processed in the same manner as in Clause (3: Assembly of capacitor) in Example 1 to prepare a capacitor which is then measured for capacitance per cell in the same manner as in Clause (4-1: Measurement of chargeability/dischargeability) in Example 1. As a result, the cell capacitance is found to be 34 mF.

Figure 10:
FIG. 10 is a view showing a scanning electron microphotograph (30,000× magnification) of a section of the carbon nanotube film obtained in Example 6.

SEM photograph (30,000× magnification) of a section of the carbon nanotube film is shown in FIG. 10. As can be observed in SEM photograph, there are many sites where small diameter carbon nanotubes are present entangled with the contact of great diameter carbon nanotubes with each other. It is presumed that these sites contribute to the enhancement of film strength.

The carbon nanotube film of the invention has a potential applicability to various arts of electrical, electronic, mechanical, physical, chemical, biological and other elements, parts, members and materials which are required to have a greater thickness without impairing the functions characteristic to carbon nanotube and its usefulness is unfathomable. In some detail, the realization of a microwave absorber having a high wave absorption efficiency and a resistance element having a high electric conductivity can be expected.

What is claimed is:

1. A capacitor comprising;
a separator;
an electrolyte;
a pair of polarizable electrodes; and
a pair of collecting electrodes,
wherein the separator is sandwiched between the polarizable electrodes,
the separator and the polarizable electrodes are sandwiched between the collecting electrodes, and
each polarizable electrode comprises a carbon nanotube film and is impregnated with the electrolyte,
wherein the carbon nanotube film includes:
  (i) a first carbon nanotube group that is an aggregate of first carbon nanotubes crosslinked to each other to form a network structure; and
  (ii) a second carbon nanotube group that is an aggregate of second carbon nanotubes having a diameter different from a diameter of the carbon nanotubes in the first carbon nanotube group,
wherein the first carbon nanotube group and the second carbon nanotube group are in admixture,
the first and second carbon nanotubes are multi-walled carbon nanotubes,
ones of the first and second carbon nanotubes have a number-average diameter of from 10 to 50 times of that of the other ones of the first and second carbon nanotubes, and
the proportion of ones of the first and second carbon nanotubes, which are larger in diameter, falls in a range from 55% to 70%.

2. The capacitor according to claim 1, wherein the carbon nanotube film has a thickness of approximately 70 µm or more.

* * * * *